No. 868,510. PATENTED OCT. 15, 1907.
H. U. WAKEFIELD.
HARROW.
APPLICATION FILED FEB. 27, 1906. RENEWED APR. 17, 1907.

Harry U. Wakefield,
INVENTOR

WITNESSES:

By C. A. Snow & Co.
ATTORNEYS

UNITED STATES PATENT OFFICE.

HARRY URBAN WAKEFIELD, OF CORNERSVILLE, TENNESSEE.

HARROW.

No. 868,510. Specification of Letters Patent. Patented Oct. 15, 1907.

Application filed February 27, 1906, Serial No. 303,235. Renewed April 17, 1907. Serial No. 368,727.

*To all whom it may concern:*

Be it known that I, HARRY URBAN WAKEFIELD, a citizen of the United States, residing at Cornersville, in the county of Marshall and State of Tennessee, have invented a new and useful Harrow, of which the following is a specification.

This invention relates to that class of harrows which are composed of a plurality of bars connected together by links and having downward projecting teeth or spikes, and the principal object of the invention is to provide improved means whereby the harrow bars may be tilted for the purpose of discharging trash accumulated by the teeth.

Another object of the invention is to provide improved means for linking the harrow bars together.

Still other objects of the invention are to promote simplicity, durability and efficiency in the construction and operation of this class of devices.

With these and other ends in view, which will readily appear as the nature of the invention is better understood, the same consists in the improved construction and novel arrangement and combination of parts, which will be hereinafter fully described and particularly pointed out in the claims.

In the accompanying drawings have been illustrated simple and preferred forms of the invention; and in said drawings Figure 1 is a top plan view illustrating a preferred form of harrow constructed in accordance with the principles of the invention. Fig. 2 is a side elevation of the same showing the harrow bars in position for operation. Fig. 3 is a side elevation showing the harrow bars tilted to place the rake teeth in discharging position. Fig. 4 is a side elevation illustrating a modified form of the invention. Fig. 5 is a perspective detail view showing the slidable sleeve and the hook member connected therewith. Fig. 6 is a perspective view showing a portion of a harrow bar and illustrating a form of staples and links for connecting the harrow bars. Fig. 7 is a transverse sectional view of a portion of a harrow bar illustrating a modification in the construction of the staples. Fig. 8 is a sectional detail view taken on the plane indicated by the line 8—8 in Fig. 4.

Corresponding parts in the several figures are indicated throughout by similar characters of reference.

The improved harrow is composed of a plurality of bars 1, 1 having downward extending teeth or spikes 2, 2. The harrow bars are connected with each other by means of links 3, 3 engaging eyes or staples 4, 4 which are connected with the harrow bars. Said staples may be formed of wire of suitable dimensions, bent to form the eyes 5 and the juxtaposed shanks 6 and 7, the former of which are of a length to extend through the harrow bars, while the latter merely extend a sufficient distance into the wood of which the harrow bars are composed to be sufficiently braced and reinforced to avoid danger of being pulled out when subjected to pulling strain. The eyes 5 are bent at suitable angles to the shanks, so that, when the harrow bars are connected up by means of the links, their normal position will be slightly tilted, as will readily appear from the drawings. The staples may be secured upon the bars by means of washers, as 8, mounted upon the long shanks 6, after which the latter are upset or headed, as will be best seen in Fig. 5 of the drawings; or the ends of the shanks 6 may be threaded for the reception of nuts 9, as will be seen in Fig. 6.

A harrow constructed as herein described, when stretched by exercising longitudinal strain upon the front and rear bars, will stand upright upon the teeth or spikes 2, 2; when slackened, the harrow bars will drop, and the teeth or spikes will thus be tilted. This stretching and slackening may be effected by means which will now be described.

10 designates a rigid bar, preferably constructed of metal, and provided at its front end with a downturned hook member 11 which engages a staple 12 upon the front side of the front harrow bar.

13 is a sleeve or member slidably engaging the bar 10 and carrying an arm 14 provided at its extremity with a hook 15 engaging a staple 16 upon the adjacent side of the rear harrow bar. It will be observed that by sliding or moving the sleeve 13 in a rearward direction upon the bar 10, the harrow will be tightened, and the teeth will assume an approximately vertical position, while by moving the sleeve in a forward direction, the harrow will be slackened, and the teeth will be tilted in a rearward direction for the discharge of trash accumulated thereby.

Under the construction illustrated in Figs. 1 and 2 of the drawings, the adjustment of the sleeve 13 is effected by means of a lever 17 pivoted upon the bar 10 and connected by means of a link rod 18 with the sleeve 13; the forward end of the link rod being adjustable in any one of a plurality of perforations 19 when formed in the lever 17 at various distances from the fulcrum of the latter; by properly adjusting the link 18, the teeth of the harrow may be normally maintained at various inclinations, as will be readily understood. The lever 17 has a knee or bent portion 20 whereby, when said lever is lowered for the purpose of pushing the sleeve 13 in a rearward direction, thus tautening the harrow, the point at which the link 18 is connected with the lever is carried below a line drawn through the fulcrum of the lever and the point at which the link 18 is connected with the sleeve 13, thereby locking the lever and sustaining the harrow securely in operative position; by raising the lever, the sleeve 13 will be permitted to slide in a forward direction, thus slackening the harrow, permitting the bars to drop, and thus tilting the teeth to a discharging position.

Under the construction illustrated in Fig. 4, an operating lever 21 is pivoted upon the sleeve 13, and said lever is provided with a stop member 22 adapted to engage one of a plurality of perforations 23, in the bar 10 through an aperture 28′ in the sleeve 13, or in the arm 14, which latter, it will be understood, virtually forms a part of said sleeve. A connecting rod or link 24 connects the lever 21 with the bar 10. It will be seen that by manipulating the lever 21, the sleeve 13 may be moved upon the bar 10 to tighten or to slacken the harrow, as may be desired, and that by engaging the stop 22 with the perforations 23, 23′, the parts may be securely sustained at various adjustments.

The front harrow bar is provided with clevises 25 with which are connected the ends of draft chains 26, which latter are connected by means of a link or ring 27 to which the draft may be applied in any suitable manner. It will be readily understood that by shortening or lengthening one of the draft chains, the harrow may be dragged over the field in an angling or oblique position, when desired. It will also be understood that the draft may be applied to the rear end of the harrow, if desired.

From the foregoing description, taken in connection with the drawings hereto annexed, the operation and advantages of this invention will be readily understood. The construction is very simple, and the improved harrow may be easily manipulated with satisfactory results.

Having thus described the invention, what is claimed is:—

1. A harrow composed of a plurality of toothed bars linked together, a relatively stationary stretching bar having a downturned hook member connected with the front harrow bar, a detachable sleeve open on one side and slidable upon the stretching bar an arm forming a closure for the open end of the slide and provided with a hook connected with the adjacent harrow bar, and pivotally connected members pivoted respectively upon the stretching bar and upon the sleeve, one of said members being extended to form a handle.

2. A harrow composed of a plurality of toothed bars linked together, in combination with a rigid stretching bar having a downturned hook connected with the front harrow bar, a sleeve slidable upon the stretching bar and having a hook member connected with the rear harrow bar, a lever pivoted upon the stretching bar and having a knee and provided with a plurality of perforations between said knee and its fulcrum, and a link connecting one of said perforations with the slidable sleeve.

In testimony that I claim the foregoing as my own, I have hereto affixed my signature in the presence of two witnesses.

HARRY URBAN WAKEFIELD.

Witnesses:
  NORA YOWELL,
  M. E. GALLY.